United States Patent Office 3,326,957
Patented June 20, 1967

3,326,957
N-BORYL- AND N,N'-DIBORYLOXAMIDINES
AND PROCESS OF FORMING SAME
Swiatoslaw Trofimenko, Philadelphia, Pa., assignor to E. I.
du Pont de Nemours and Company, Wilmington, Del.,
a corporation of Delaware
No Drawing. Filed Apr. 1, 1965, Ser. No. 444,829
20 Claims. (Cl. 260—462)

This invention relates to a new class of heterocyclic structures. More particularly, it relates to, and has as its principal objects provision of, a new class of mono- and diboryloxamidines and a process for their preparation.

The products of this invention have the formula

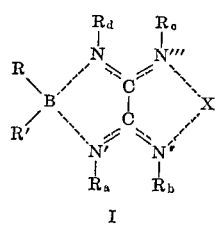

I wherein X is hydrogen or BRR'; $R_a$, $R_b$, $R_c$, and $R_d$, which may be alike or different, are hydrocarbon groups of 1–12 carbon atoms; and R and R', which may be alike or different, are hydrocarbon groups of 1–12 carbon atoms, hydrocarbonoxy groups of 1–12 carbon atoms, hydrogen, or halogen, i.e., fluorine, chlorine, bromine, or iodine.

The hydrocarbon and hydrocarbonoxy groups of 1–12 carbon atoms referred to above are alkyl, alkenyl, cycloalkyl, or aryl groups and their oxy, including dioxy, derivatives. Examples of such groups are ethyl, isopropyl, sec.-amyl, n-dodecyl, vinyl, butenyl, cyclohexyl, cyclopentyl, p-tolyl, naphthyl, p-chlorophenyl, methoxy, ethoxy, isopropoxy, vinyloxy, n-decanoxy, cyclohexanoxy, and phenoxy.

The diboryl tetrasubstituted oxamidines have the formula

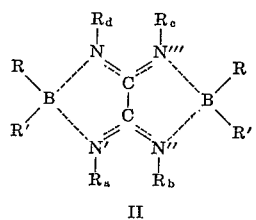

II the R groups being as defined above.

The above formulas are believed to represent the novel products of this invention must satisfactorily, although other formulas such as charge separation formulas and formulas of the type

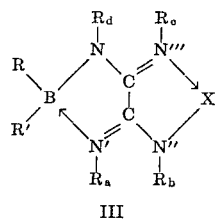

III can be employed. In using a formula like III, it is understood that an exceedingly rapid alternation or equilibrium is implied between two such structures, viz.

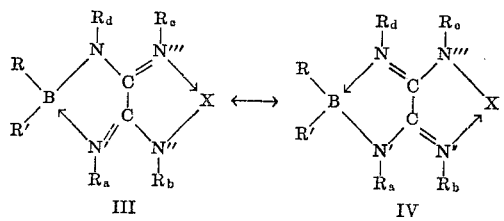

III                 IV

The novel compounds of this invention are named herein from the tetrasubstituted oxamidines, i.e., ethanamidines:

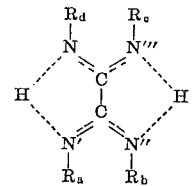

V it being understood that formulas analagous to those above can also be used for the oxamidines.

These products are prepared by reaction of a tetrasubstituted oxamidine (V) with at least an equimolar quantity of a borane BRR'R" with elimination of HR", preferably in the presence of an inert solvent or reaction medium. In the foregoing formulas, $R_a$, $R_b$, $R_c$, $R_d$, R, and R' have the same significance as in Formula I above; R" represents a hydrocarbon or hydrocarbonoxy group of 1–12 carbon atoms (the same groups as defined above for R and R'), hydrogen, or halogen, i.e., fluorine, chlorine, bromine, or iodine. The reactivity of groups attached to boron when used in this process decreases in the order halogen, hydrogen, alkyl, aryl. Thus, for example, on reaction of methylphenylchloroborane with sym-tetramethyloxamidine, the product is N,N"-bis(methylphenylboryl)-sym-tetramethyloxamidine, i.e., the group (R") eliminated is Cl. The borane may be employed in the form of an addition product with an ether or an amine.

Equations for the reactions can be written as

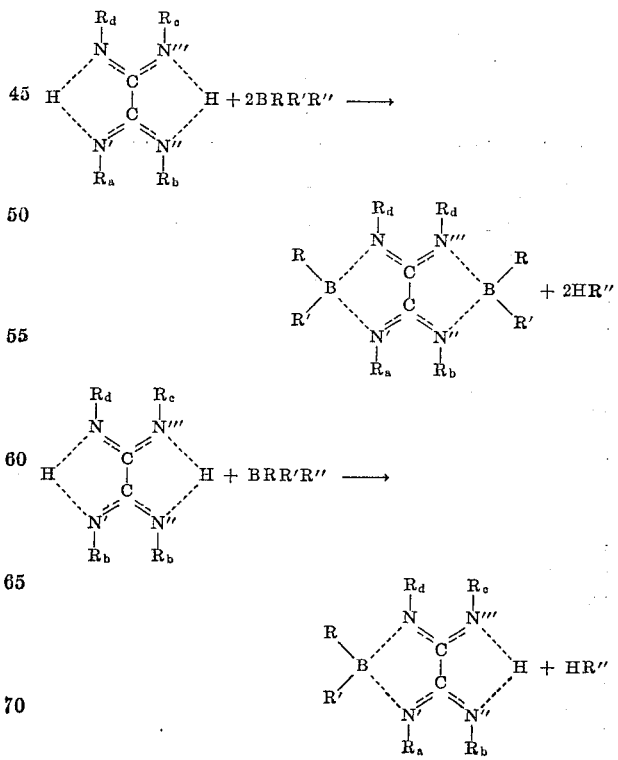

It is sometimes desirable, though by no means necessary, to carry out the reaction in a medium or diluent. Suitable media for the reaction are aliphatic and aromatic hydrocarbons, halocarbons, ethers, tertiary amines, and, in general, any liquid devoid of active hydrogen as determined by the Zerewitinoff test. Suitable media, aside from those shown in the examples below, include cyclohexane, n-octane, sym-tetrachloroethane, di-n-butyl ether, and triethylamine.

The process is carried out at a temperature in the range from −20 to 200° C. The preferred temperature for a particular reaction is determined by the nature of the group R″ being removed from the borane as HR″ and is that temperature at which a satisfactory rate of removal is maintained. When R″ is halogen, low temperatures, i.e., below room temperature and often below 0° C., are permissible. When R″ is a hydrocarbon group, evolution of HR″ usually commences in the neighborhood of 100° C., i.e., from about 75°–125° C. When R″ is aryl, higher temperatures up to 200° C. may be required.

While it is possible to run the reaction at super- and subatmospheric pressures, such as pressures in the range of 0.1–5 atmospheres, pressure is not a critical parameter. The reaction is most conveniently conducted at atmospheric pressure. An inert atmosphere, such as an atmosphere of nitrogen, helium, argon, or methane, is preferred in view of the sensitivity of the boranes to air. It is also advisable to exclude moisture from the reaction.

The following nonlimiting examples illustrate the process and products of the invention in more detail. In these examples the products are characterized by chemical analysis, infrared absorption (IR), and nuclear magnetic resonance (n-m-r). Pressures are ambient atmospheric unless otherwise noted.

EXAMPLE 1

*N,N′-bis(dihydroboryl)-sym-tetrapropyloxamidine*

(Formula II; $R_a$, $R_b$, $R_c$, $R_d$=n-$C_3H_7$; R, R′=H)

sym-Tetrapropyloxamidine (0.01 mole) and trimethylamineborane (0.02 mole) were heated together until evolution of trimethylamine and hydrogen stopped and the melt refluxed. The melt was poured into a watch glass and cooled to room temperature forming a syrupy liquid. After several days the syrup solidified. The solid was N,N″-bis(dihydroboryl)-sym-tetrapropyloxamidine having a B-H absorption band in the infrared at 2320 cm.$^{-1}$.

EXAMPLE 2

*N,N″-bis(diphenylboryl)-sym-tetrapropyloxamidine*

(Formula II; $R_a$, $R_b$, $R_c$, $R_d$=n-$C_3H_7$; R, R′=$C_6H_5$)

A. sym-Tetrapropyloxamidine (0.005 mole) and triphenylborane (0.01 mole) were mixed and heated for 10 minutes at 160–190° C. The melt bubbled vigorously. The product was purified by sublimation at 300° C. under 2 mm. pressure to obtain N,N″-bis(diphenylboryl)-sym-tetrapropyloxamidine in 90% yield. After recrystallization and a further sublimation, the product had a melting point of 190° C.

*Analysis.*—Calcd. for $C_{36}H_{48}B_2N_4$: C, 78.5; H, 8.26; N, 9.62. Found: C, 78.5; H, 8.52; N, 9.37.

The n-m-r spectrum showed a doublet at 2.68 τ (relative area 5), an unresolved triplet at 6.38 τ (relative area 2) and a complex mutiplet at 8.5–9.0 τ (relative area 5) which confirmed the above identification. The ultraviolet absorption in isooctane showed maxima at 270 and 280 mμ having extinction coefficients, ε, of 28,000 and 25,300 respectively and a shoulder at 293 mμ having ε=12,100.

B. The above reaction was repeated on a 0.1 molar scale yielding 78% of recrystallized material.

EXAMPLE 3

*N,N″-bis(diphenylboryl)-sym-tetraethyloxamidine*

(Formula II; $R_a$, $R_b$, $R_c$, $R_d$=$C_2H_5$; R, R′=$C_6H_5$)

sym-Tetraethyloxamidine (0.005 mole) and triphenylborane (0.01 mole) were heated as in Example 2. The crude product, obtained in 92% yield, was purified by sublimation.

*Analysis.*—Calcd. for $C_{34}H_{40}B_2N_4$: C, 77.7; H, 7.62. Found: C, 78.0; H, 7.65.

The product had a melting point of 250–251° C. The n-m-r spectrum, which showed a doublet (relative area 5) at 2.67 τ, a quadruplet (relative area 2) at 6.65 τ, and a triplet (relative area 3) at 9.22 τ, confirmed that the product was N,N″-bis(diphenylboryl)-sym-tetraethyloxamidine. The ultraviolet absorption spectrum in isooctane showed maxima at 270 and 280 mμ having extinction coefficients above 27,100 and 24,400 respectively and a shoulder at 293 mμ with extinction coefficient above 11,600.

EXAMPLE 4

*N,N″-bis(diethylboryl)-sym-tetraethyloxamidine*

(Formula II; $R_a$, $R_b$, $R_c$, $R_d$, R, R′=$C_2H_5$)

A. To a suspension of 9.9 g. (0.05 mole) of sym-tetraethyloxamidine in 150 ml. benzene, under nitrogen, was added slowly 13.7 ml. (0.1 mole) of triethylborane. Slight warming of the mixture occurred and the solid went quickly into solution. No gas was evolved. The solution was refluxed for three hours, during which time 1.9 liters of gas was evolved. The solution was stripped of low-boiling components and the residue recrystallized from ethanol to yield 6.4 g. of crystalline N,N″-bis-(diethylboryl)-sym-tetraethyloxamidine, M.P. 165° C. The filtrate was purified by chromatography yielding an additional 2.8 g. of product. On heating above the melting point, the melted product remained colorless in air up to 310 °C. and became only slightly amber at temperatures above 400° C.

*Analysis.*—Calcd. for $C_{18}H_{40}B_2N_4$: C, 64.6; H, 12.0; N, 16.7. Found: C, 65.1; H, 11.8; N, 16.4.

The identity of the product was confirmed by its n-m-r spectrum which showed a quadruplet at 6.73 τ (relative area 2), a triplet at 8.72 τ (relative area 3) and an unresolved multiplet centered at 9.53 τ (relative area 5). The ultraviolet spectrum (in isooctane) exhibited a maximum in absorption, $\lambda_{max}$, at 279 mμ having an extinction coefficient, ε, of 18,200.

B. The reaction above was repeated using amounts of reactants and solvent based on 16.6 g. of sym-tetraethyloxamidine with toluene as solvent. The crude product was purified by chromatography on alumina using hexane as the packing and eluting medium. N,N″-bis(diethylboryl)-sym-tetraethyloxamidine was obtained in 95.5% yield.

EXAMPLE 5

*N,N″-bis(dibromoboryl)-sym-tetrapropyloxamidine*

(Formula II; $R_a$, $R_b$, $R_c$, $R_d$=n-$C_3H_7$; R, R′=Br)

To a solution of 10 ml. of boron tribromide, i.e., tribromoborane (26.4 g., 0.105 mole), in 200 ml. of carbon tetrachloride was added a solution of 12.7 g. (0.05 mole) of sym-tetrapropyloxamidine in 300 ml. of toluene. A solid precipitated during the addition. The reaction mixture was left standing for two days at room temperature and then filtered to obtain 26.4 g. (89%) of solid N,N″-bis(dibromoboryl) - sym - tetrapropyloxamidine. A small sample of the product was purified by recrystallization from chlorobenzene followed by sublimation above 200° C. under 1 mm. pressure.

Analysis.—Calcd. for $C_{14}H_{28}B_2Br_4N_4$: C, 28.3; H, 4.72; Br, 53.8. Found: C, 28.9; H, 4.84; Br, 53.5.

The ultraviolet absorption spectrum in isooctane had a maximum at 265 m$\mu$ ($\epsilon$ >11,500).

EXAMPLE 6

*N,N''-bis(dihydroboryl)-sym-tetramethyloxamidine*

(Formula II; $R_a$, $R_b$, $R_c$, $R_d$=CH$_3$; R, R'=H)

A mixture of sym-tetramethyloxamidine (0.05 mole) and borane (0.10 mole as a 1.0 molar solution in tetrahydrofuran) and an additional 200 ml. of dry tetrahydrofuran was refluxed overnight. Hydrogen (2.5 liters) was evolved. The solution was concentrated at 65° C. in vacuum yielding a taffy-like residue which was purified by sublimation. The sublimate was obtained was shiny white needles which were recrystallized from n-heptane. The sublimate was N,N''-bis(dihydroboryl)-sym-tetramethyloxamidine, M.P. 169–170° C.

Analysis.—Calcd. for $C_6H_{16}B_2N_4$: C, 43.4; H, 9.65; N, 33.7. Found: C, 43.6; H, 9.59; N, 33.3.

The ultraviolet absorption spectrum in isooctane had a maximum at 280 m$\mu$ ($\epsilon$=17,400) and shoulders at 288 m$\mu$ ($\epsilon$=15,100) and 302 m$\mu$ ($\epsilon$=6840).

EXAMPLE 7

*N,N''-bis(diphenylboryl)-sym-tetramethyloxamidine*

(Formula II; $R_a$, $R_b$, $R_c$, $R_d$=CH$_3$; R, R'=C$_6$H$_5$)

sym-Tetramethyloxamidine (14.2 g., 0.1 mole) and triphenylborane (48.4 g., 0.2 mole) were refluxed together in 250 ml. of o-dichlorobenzene, benzene being fractionally distilled through a small Vigreux column. When benzene ceased to distill out, the hot solution was cooled yielding white crystals which were removed by filtration, washed with ether, and air-dried. These crystals were N,N''-bis(diphenylboryl) - sym - tetramethyloxamidine, M.P. 280° C. The filtrate was worked up to obtain additional product making a total yield of 86% of theory.

Analysis.—Calcd. for $C_{30}H_{32}B_2N_4$: C, 76.6; H, 6.82; N, 11.9. Found: C, 76.5; H, 6.64; N, 11.9

The n-m-r spectrum showed two singlets at 2.77 and 6.99 $\tau$ (relative areas 5 and 3, respectively) confirming the identification of the product. The ultraviolet absorption spectrum in isooctane showed maxima at 270 m$\mu$ ($\epsilon$ >40,000) and 278 m$\mu$ ($\epsilon$ >36,200); and a shoulder at 292 m$\mu$ ($\epsilon$>16,900).

EXAMPLE 8

*N,N''-bis(diethylboryl)-sym-tetramethyloxamidine*

(Formula II; $R_a$, $R_b$, $R_c$, $R_d$=CH$_3$; R, R'=C$_2$H$_5$)

Triethylborane (27 ml., 0.19 mole) was added to sym-tetramethyloxamidine (2.14 g., 0.1 mole) in 200 ml. of tetrahydrofuran and the resulting solution was refluxed under nitrogen overnight. The amount of gas evolved was 4.25 liters. The clear solution was evaporated to dryness and the residue recrystallized from toluene yielding 6.5 g. (63%) of N,N''-bis(diethylboryl)-sym-tetramethyl oxamidine as colorless crystals, M.P. 160–161° C.

Analysis.—Calcd. for $C_{14}H_{32}B_2H_4$: C, 60.4; H, 11.5. Found: C, 59.8; H, 11.4.

A further 7.0 g. (25%) of crude product was obtained by working up the mother liquor. The ultraviolet absorption spectrum in isooctane had a maximum at 280 m$\mu$ ($\epsilon$=18,100).

EXAMPLE 9

*N,N''-bis(o-phenylenedioxyboryl)-sym-tetrapropyloxamidine*

(Formula II; $R_a$, $R_b$, $R_c$, $R_d$=n-C$_3$H$_7$; R, R'=C$_6$H$_4$O$_2$)

A solution of 11 g. (0.1 mole) of pyrocatechol in 100 ml. of tetrahydrofuran was added slowly to 100 ml. of a 1N solution of borane in tetrahydrofuran with the evolution of 4.8 liters of hydrogen. A solution of 12.7 g. (0.05 mole) of sym-tetrapropyloxamidine in the least amount of tetrahydrofuran necessary to effect solution was added and the mixture was refluxed overnight. Tetrahydrofuran was then distilled out, replaced by xylene, and refluxing continued for several hours. The crude reaction mixture was chromatographed on alumina using ether for packing and eluting. The first fraction (3.6 g., 16%) was a solid which gave a negative ferric chloride test. Subsequent fractions gave positive tests and were discarded. The product was purified by sublimation at 200° C. under 1 mm. pressure and melted at 245–246° C. It was N,N''-bis(o-phenylenedioxyboryl)-sym-tetrapropyloxamidine.

Analysis.—Calcd. for $C_{26}H_{36}B_2N_4O_4$: C, 63.7; H, 7.35. Found: C, 63.8; H, 7.43.

EXAMPLE 10

*N-Diphenylboryl-sym-tetramethyloxamidine*

(Formula I; $R_a$, $R_b$, $R_c$, $R_d$=CH$_3$; R, R'=C$_6$H$_5$; X=H)

A mixture of 14.2 g. (0.1 mole) of sym-tetramethyloxamidine and 29 g. (0.12 mole) of triphenylborane was refluxed in 250 ml. of dichlorobenzene until benzene ceased to distill out. The solution was stripped of solvent in vacuum and the residue recrystallized from dimethylformamide to obtain 6.4 g. of crystalline solid, which was identified as N,N'' - bis(diphenylboryl)-sym-tetramethyloxamidine. The crystallization liquor was chromatographed on alumina and separated into three fractions by successive elution with ether (fraction 1), methylene chloride (fraction 2), and methanol (fraction 3). Fraction 2, which had an infrared absorption at 3250 cm.$^{-1}$ characteristic of the NH group, was N-diphenylboryl-sym-tetramethyloxamidine. After recrystallization from toluene, it melted at 230–231° C. It was sublimed at 230° C. under a pressure of 1 mm. to obtain a sample for analysis.

Analysis.—Calcd. for $C_{18}H_{23}BN_4$: C, 70.6; H, 7.53. Found: C, 70.5; H, 7.03.

Fraction 1 was an intermediate fraction and fraction 3 was additional N,N''-bis(diphenylboryl)-sym-tetramethyloxamidine.

EXAMPLE 11

A.—*N,N''-diphenyl-N',N'''-dipropyloxamidine*

(Formula V; $R_b$, $R_d$=C$_6$H$_5$; $R_a$, $R_c$=n-C$_3$H$_7$)

A solution of 277 g. (1 mole) of N,N'-diphenyloxamidoyl chloride [prepared as described by Bauer, Ber. 40, 3653 (1907)] in 1500 ml. of benzene was added slowly, and with cooling, to a solution of 425 g. (7 moles) of N-propylamine in 2 liters of benzene. The reaction mixture was left standing overnight, filtered, and the filtrate stripped of low-boiling constituents yielding an oil as residue. This oil was stirred with 500 ml. hexane to precipitate a solid which was filtered, washed with pentane, and air-dried. There was thus obtained 270 g. (91%) of solid N,N''-diphenyl-N',N'''-dipropyloxamidine, M.P. 65–67° C. The identity of this product was confirmed by its n-m-r spectrum which had a complex multiplet centered at 2.80 $\tau$ (5 protons), a triplet at 7.10 $\tau$ (2 protons), a multiplet at 8.72 $\tau$ (2 protons), and a triplet at 9.28 $\tau$ (3 protons).

B.—N,N''-bis(diphenylboryl)diphenyldipropyloxamidines (Formula II; $R_b$, $R_d$, R, $R'=C_6H_5$; $R_a$, $R_c=n-C_3H_7$ and $R_a$, $R_d$, R, $R'=C_6H_5$; $R_b$, $R_c=n-C_3H_7$)

A mixture of 15 g. (0.05 mole) of N,N''-diphenyl-N',N'''-dipropyloxamidine (Part A) and 27 g. (0.11 mole) of triphenylborane was refluxed in 150 ml. of o-dichlorobenzene until benzene ceased to distill out. The solvent was evaporated by heating in vacuum. The residue was a mixture of N,N''-bis(diphenylboryl)-N,N'-diphenyl-N'',N'''-dipropyloxamidine and N,N''-bis(diphenylboryl)-N,N''-diphenyl-N',N'''-dipropyloxamidine. This mixture was chromatographed rapidly on alumina, using ether for packing and eluting. The two main fractions so obtained melted at 203–216° C. (A), and about 220° C. (B), respectively.

*Analysis.*—Calcd. for $C_{44}H_{44}B_2N_4$: C, 81.3; H, 6.78. Found: Fraction A: C, 81.4; H, 6.92. Fraction B: C, 81.6; H, 7.14.

The n-m-r spectra support the assigned structures with a 15-proton multiplet centered at 2.8 τ, a 2-proton multiplet centered at 7.2 τ, and a 2-proton multiplet centered at 9.5 τ. (The methyl peak was beyond 10 τ.)

EXAMPLE 12

N,N''-bis(diphenylboryl)-sym-tetraphenyloxamidine (Formula II; $R_a$, $R_b$, $R_c$, $R_d$, R, $R'=C_6H_5$)

A mixture of 39 g. (0.1 mole) of sym-tetraphenyloxamidine and 53 g. (0.22 mole) of triphenylborane was refluxed in 400 ml. of o-dichlorobenzene until benzene ceased to distill out. The solution was cooled and stirred with 600 ml. of hexane to precipitate a white solid which was filtered and air-dried. The yield was 56.0 g. (78%). Another 7.5 g. (10%) of the solid product was obtained by working up the filtrate. The product was purified by sublimation at 280° C. under 1 mm. pressure and melted at 285–286° C. remaining undecomposed even at 470° C. It was N,N''-bis(diphenylboryl)-sym-tetraphenyloxamidine.

*Analysis.*—Calcd. for $C_{50}H_{40}B_2N_4$: C, 83.5; H, 5.57. Found: C, 83.7; H, 5.71.

EXAMPLE 13

N,N''-bis(diethylboryl)-sym-tetraphenyloxamidine (Formula II; $R_a$, $R_b$, $R_c$, $R_d=C_6H_5$; R, $R'=C_2H_5$)

A mixture of 78 g. (0.2 mole) of sym-tetraphenyloxamidine and 56 ml. (0.4 mole) of triethylborane in 500 ml. toluene was refluxed for three days under nitrogen. Ten liters of ethane was evolved. The solution so obtained was evaporated to dryness by heating at 100° C. in vacuum, and the residue recrystallized from a mixture of benzene and heptane. A total of 69.6 g. (67.3%) of N,N''-bis(diethylboryl)-sym-tetraphenyloxamidine was obtained which, after purification by vacuum sublimation, melted at 244–245° C.

*Analysis.*—Calcd. for $C_{34}H_{40}B_2N_4$: C, 77.7; H, 7.61. Found: C, 78.3; H, 7.76.

The n-m-r spectrum of the product with a sharp phenyl singlet at 3.08 τ and a complex ethyl multiplet centered at 9.28 τ, both of equal area, confirms this structure.

sym-Tetrasubstituted oxamidines in addition to those of the examples which may be used in the invention, e.g., in the process of Example 3, include: sym-tetra-n-butyloxamidine; sym-tetraisobutyloxamidine; sym-tetraphenyloxamidine; sym-tetra-o-tolyloxamidine; N,-N''-diphenyl-N',N'''-di-o-tolyloxamidine; N,N'' - diphenyl - N',N''' - di-m-tolyloxamidine; N,N''-diphenyl - N',N'''-di-p-tolyloxamidine; N,N''-di-o-tolyl-N',N'''-di-m-tolyloxamidine; N,N''-di-o-tolyl-N',N'''-di-p-tolyloxamidine; etc.

The table which follows lists additional compounds of the invention (column 3) which may be obtained by reacting boranes (column 1) with sym-tetraethyloxamidine, e.g., by the procedure of the example noted (column 2):

TABLE

| Borane | Procedure of Example | Product |
| --- | --- | --- |
| Tri-m-xylylborane | 3 | N,N''-bis(di-m-xylylboryl)-tetraethyloxamidine. |
| Tri-A-naphthylborane | 3 | N,N''-bis(di-α-naphthylboryl)-tetraethyloxamidine. |
| Dimethylborane | 4 | N,N''-bis(dimethylboryl)-tetraethyloxamidine. |
| Diethylborane | 4 | N,N''-bis(diethylboryl)tetraethyloxamidine. |
| Dimethylbromoborane | 5 | N,N''-bis(dimethylboryl)-tetraethyloxamidine. |
| Dibutylbromoborane | 5 | N,N''-bis(dibutylboryl)tetraethyloxamidine. |
| Diphenylchloroborane | 5 | N,N''-bis(diphenylboryl)tetraethyloxamidine. |
| Methylborane | 10 | N-methylhydroboryltetraethyloxamidine. |
| Ethylborane | 10 | N-ethylhydroboryltetraethyloxamidine. |
| Butylborane | 10 | N-butylhydroboryltetraethyloxamidine. |
| Phenylborane | 10 | N-phenylhydroboryltetraethyloxamidine. |
| Bis(2-chlorovinyl)chloroborane. | 5 | N,N''-bis(dichlorovinylboryl)-tetraethyloxamidine. |

Still further compounds of the invention are: N,N-bis(dicyclohexylboryl)-sym-tetrapropyloxamidine and N-methylboryl-N''-hydroboryl-N,N''-dicyclohexyl - N',N''' - dimethyloxamidine.

As is apparent from Formula I, the compounds of this invention fall into two classes, viz., those in which X is hydrogen and those in which X is BRR'. Compounds of both classes exhibit opacity or opaqueness towards certain wave lengths of ultraviolet light, i.e., light having a wave length below 400 millimicrons, and hence are generically useful in protecting light-sensitive or light-fugitive materials against degradation by ultraviolet light. For example, the mono- or diboryloxamidines can be incorporated in films and fibers of natural or synthetic organic polymers many of which fail prematurely when exposed intermittently or continuously to ultraviolet light to reduce deterioration of the polymers and/or of dyes used therewith in the presence of ultraviolet light. For this purpose, 0.001–10%, preferably 0.01–5%, of the mono- or diboryloxamidine based on the weight of the polymer is normally used. The compounds are also valuable for incorporation in containers, covers for display cases, and the like where protection of the contents from the deleterious action of ultraviolet light is desired. The compounds can be incorporated in polymers by conventional procedures. Certain diboryloxamidines are resistant to thermal degradation and are useful as stable liquids in hydraulic devices exposed to high temperature. The monoboryloxamidines can be polymerized to polymers containing recurring boryloxamidine units.

Since obvious modifications and equivalents in the invention will be evident to those skilled in the chemical arts, I propose to be bound solely by the appended claims.

The embodiment of the invention in which an exclusive property or privilege is claimed are defined as follows:

1. A compound of the formula

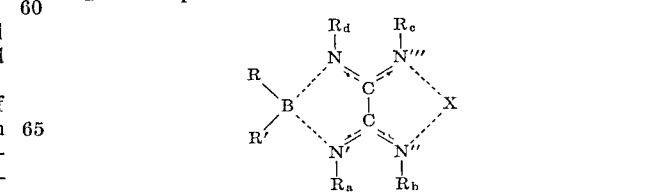

wherein: $R_a$, $R_b$, $R_c$ and $R_d$ are selected from the group consisting of alkyl, alkenyl, cycloalkyl, aryl, alkoxy, alkenyloxy, cycloalkoxy and aryloxy of up to 12 carbons; and X is selected from the group consisting of hydrogen and BRR', R and R' being selected from the group consisting of hydrogen, halogen, and alkyl, alkenyl, cycloalkyl, aryl, alkoxy, alkenyloxy, cycloalkoxy and aryloxy of up to 12 carbons.

2. N,N″-bis(diphenylboryl)sym-tetrapropyloxamidine.
3. N,N″-bis(diphenylboryl)-sym-tetraethyloxamidine.
4. N,N″-bis(diethylboryl)sym-tetraethyloxamidine.
5. N,N″-bis(dibromoboryl)sym-tetrapropyloxamidine.
6. N,N″-bis(dihydroboryl)sym-tetramethyloxamidine.
7. N,N″-bis(o-phenylenedioxyboryl)sym-tetrapropyloxamidine.
8. N-diphenylboryl-sym-tetramethyloxamidine.
9. N,N″-bis(diphenylboryl)-N,N′-diphenyl-N″,N‴-dipropyloxamidine.
10. N,N″-bis(diphenylboryl)sym-tetraphenyloxamidine.
11. N,N″-bis(diethylboryl)sym-tetraphenyloxamidine.
12. The process of forming a compound of claim 1 which comprises reacting, at a temperature in the range −20° to 200° C.
a tetrasubstituted oxamidine of the formula

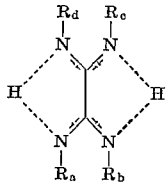

wherein $R_a$, $R_b$, $R_c$ and $R_d$ are defined as in claim 1, with a borane of the formula BRR′R″, wherein: R and R′ are as defined in claim 1; and R″ is selected from the group consisting of hydrogen, halogen and alkyl, alkenyl, cycloalkyl, aryl, alkoxy, alkenyloxy, cycloalkoxy and aryloxy of 1–12 carbons.

13. The process which comprises reacting, at a temperature in the range −20° to 200° C., sym-tetrapropyloxamidine with trimethylamineborane.

14. The process which comprises reacting, at a temperature in the range −20° to 200° C., sym-tetrapropyloxamidine with triphenylborane.

15. The process which comprises reacting, at a temperature in the range −20° to 200° C., sym-tetraethyloxamidine with triphenylborane.

16. The process which comprises reacting, at a temperature in the range −20° to 200° C., sym-tetraethyloxamidine with triethylborane.

17. The process which comprises reacting, at a temperature in the range −20° to 200° C., sym-tetrapropyloxamidine with boron-tribromide.

18. The process which comprises reacting, at a temperature in the range −20° to 200° C., sym-tetramethyloxamidine with borane.

19. The process which comprises reacting, at a temperature in the range −20° to 200° C., sym-tetrapropyloxamidine with borane.

20. The process which comprises reacting, at a temperature in the range −20° to 200° C., N,N″-diphenyl-N′,N‴-dipropyloxamidine with triphenylborane.

No references cited.

CHARLES B. PARKER, *Primary Examiner.*
BERNARD BILLIAN, *Assistant Examiner.*

PO-1050
(5/69)

UNITED STATES PATENT OFFICE
CERTIFICATE OF CORRECTION

Patent No. 3,326,957         Dated   June 20, 1967

Inventor(s) Swiatoslaw Trofimenko

It is certified that error appears in the above-identified patent and that said Letters Patent are hereby corrected as shown below:

Col. 3, 1. 38, in the name of the compound of Example 1, change "N,N'-" to -- N,N" --; and Col. 8, lines 70 and 71 (Claim 1), rewrite "cycloalk aryl. . . and aryloxy of up" as -- cycloalkyl and aryl of up --

SIGNED AND
SEALED
SEP 15 1970

(SEAL)
Attest:

Edward M. Fletcher, Jr.
Attesting Officer

WILLIAM E. SCHUYLER, JR.
Commissioner of Patents